June 5, 1962   H. G. AXTMANN   3,037,762
TRAILING ARM TORSION BAR SUSPENSION
Filed Aug. 29, 1960   2 Sheets-Sheet 1

INVENTOR.
Harold G. Axtmann
BY W. F. Wegner
ATTORNEY

June 5, 1962 H. G. AXTMANN 3,037,762
TRAILING ARM TORSION BAR SUSPENSION
Filed Aug. 29, 1960 2 Sheets-Sheet 2

INVENTOR.
Harold G. Axtmann
BY W. F. Wagner
ATTORNEY ically projecting lugs 130, 132
United States Patent Office 3,037,762
Patented June 5, 1962

3,037,762
TRAILING ARM TORSION BAR SUSPENSION
Harold G. Axtmann, Lansing, Mich., assignor to General Motors Corporation, Detroit, Mich., a corporation of Delaware
Filed Aug. 29, 1960, Ser. No. 52,466
6 Claims. (Cl. 267—11)

This invention relates to vehicle suspension and more particularly to independent suspension for dirigible wheels.

An object of the invention is to provide an improved vehicle suspension.

Another object is to provide a suspension for dirigible wheels in which the elastic medium is disposed transversely of the vehicle.

A still further object is to provide a vehicle suspension including a pair of vertically spaced trailing wheel control arms which are pivotally secured to the vehicle sprung mass on parallel vertically spaced transverse axes wherein the spring associated with the suspension for one dirigible wheel extends transversely of the vehicle in parallel alignment with the upper of the trailing arm pivot axis and the spring associated with the suspension for the other dirigible wheel extends transversely of the vehicle in parallel alignment with the lower of the trailing arm pivot axis.

Yet a further object is to provide an arrangement of the type described including means for adjusting the standing height of the vehicle after installation of the suspension structure.

Still a further object is to provide a trailing arm type suspension incorporating improved and simplified roll stabilizing means.

These and other objects, advantages and features of the invention will become more fully apparent as reference is had to the accompanying specification and drawings wherein.

Figure 1:
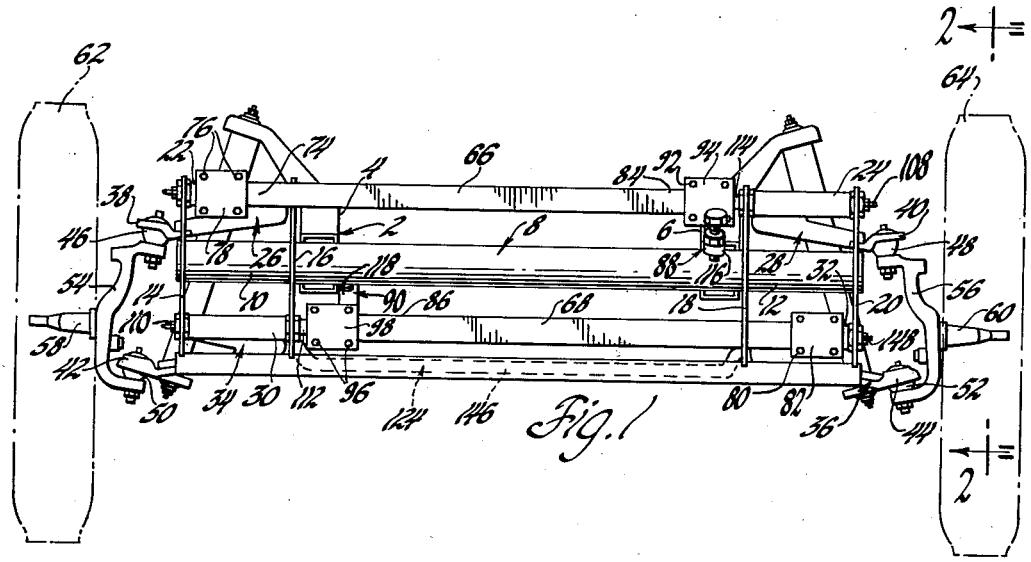
FIG. 1 is a front end elevational view of a suspension structure according to the invention.
Figure 3:
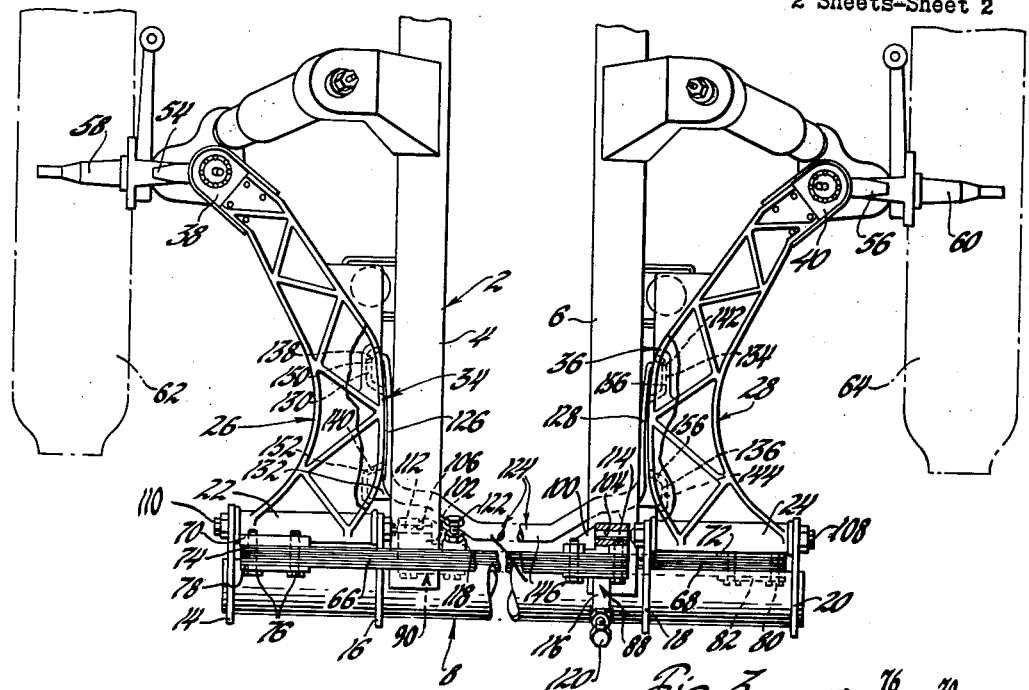
FIG. 3 is an enlarged fragmentary plan view looking in the direction of arrows 3—3 of FIG. 2.
Figure 5:
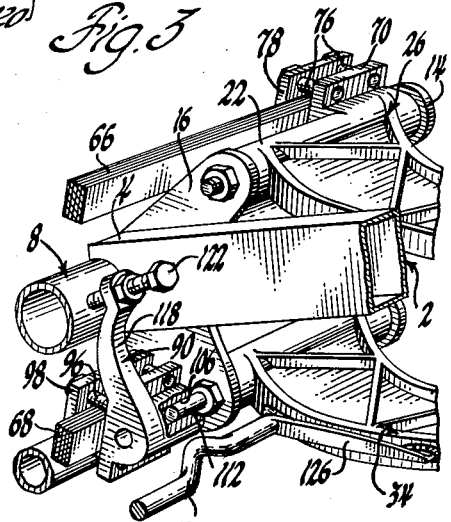
FIG. 5 is a perspective of the right hand suspension structure.

Referring now to the drawings and particularly FIG. 1, there is shown a vehicle front wheel suspension arrangement in which the reference numeral 2 designates generally the vehicle frame or superstructure. Frame 2 includes a pair of laterally spaced longitudinally extending side rails 4 and 6 which are connected at their forward ends by a transversely extending tubular cross member 8. Cross member 8 includes outrigger end portions 10 and 12 which extend beyond side rails 4 and 6 respectively and have secured thereto laterally spaced vertically extending brackets 14 and 16 and 18 and 20, respectively. Disposed between the upper ends of brackets 14 and 16 and 18 and 20 are transversely directed hub portions 22 and 24 of longitudinally extending upper wheel control arms 26 and 28. Similarly disposed between the lower ends of brackets 14 and 16 and 18 and 20 are the transversely directed hub portions 30 and 32 of longitudinally extending lower wheel control arms 34 and 36. As seen in FIGS. 1 and 3, upper control arms 26 and 28 and lower control arms 34 and 36 sweep rearwardly and outwardly and have brackets 38, 40, 42 and 44 attached to their terminal ends which in turn are connected respectively by means of ball joint assemblies 46, 48, 50, and 52 to wheel knuckles 54 and 56. Wheel knuckles 54 and 56 in turn are formed with wheel spindles 58 and 60 on which are rotatably mounted vehicle wheels 62 and 64.

In accordance with one feature of the invention, the elastic medium for the right and left wheel suspension is provided by transversely extending vertically spaced laminated leaf type torsion springs 66 and 68. As seen best in FIG. 1, springs 66 and 68 are disposed respectively in horizontal planes intersecting the common axis of rotation of upper control arm hubs 22 and 24 and lower control arm hubs 30 and 32 respectively.

Figure 2:
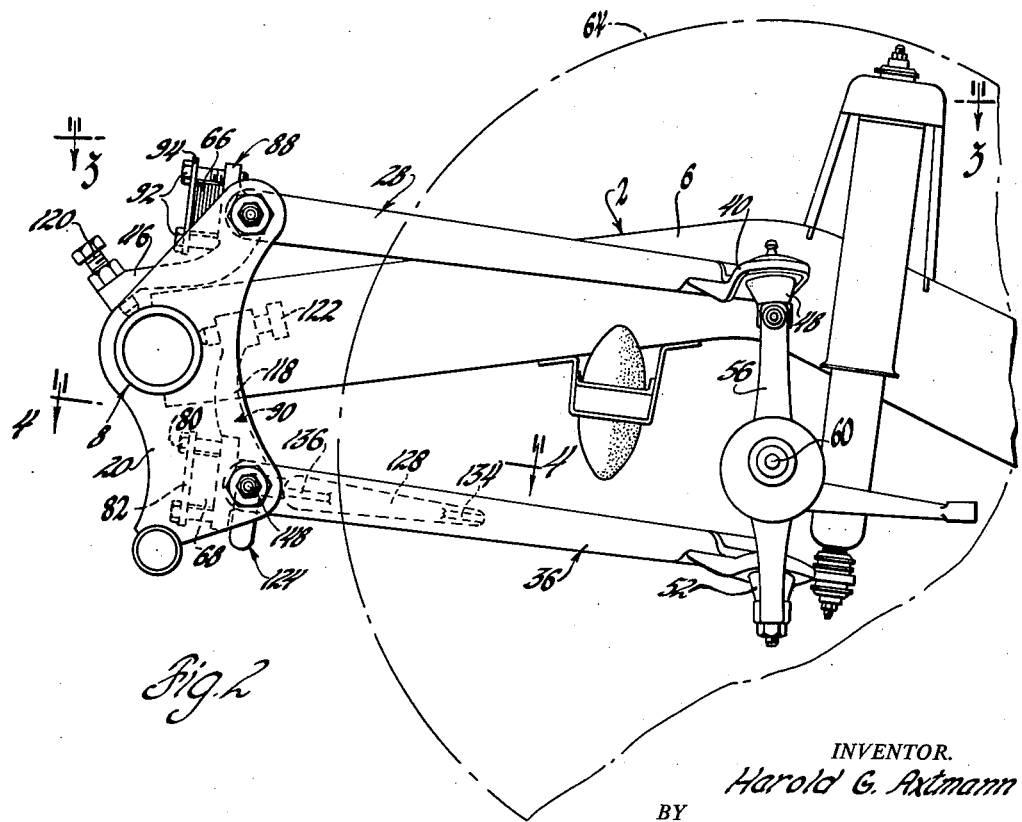
FIG. 2 is an enlarged side elevational view looking in the direction of arrows 2—2 of FIG. 1.

As seen in FIGS. 2 and 3, each of laminated springs 66 and 68 is spaced forwardly from the previously mentioned common axis so as to lie flush with rectangular boss portions 70 and 72 formed integrally on upper control arm hub 22 and lower control arm hub 32, respectively, the outer end 74 of spring 66 being attached to boss 70 by bolts 76 and clamping plate 78, and the outer end of spring 68 being attached to boss 72 by bolts 80 and clamping plate 82. The inner ends 84 and 86 of springs 66 and 68 in turn are attached to anchor members 88 and 90 by means of bolts 92, clamping bracket 94 and bolts 96, clamping bracket 98, respectively.

In accordance with another feature of the invention, anchor members 88 and 90 are formed with rearwardly offset portions 100 and 102 having transversely extending drilled passages 104 and 106 formed therein which are aligned respectively with upper control arm pivot shaft 108 and lower control arm pivot shaft 110. As seen best in FIG. 3, pivot shafts 108 and 110 are provided with inwardly projecting extensions 112 and 114 which extend into apertures 104 and 106 to form a pilot bearing for anchor brackets 88 and 90.

In accordance with a further feature of the invention, each of the anchor brackets includes an integral lever arm 116 and 118, the free end of each of which has threaded therein an adjustment bolt 120 and 122, respectively. As seen best in FIG. 2, each of the lever arms extends away from the anchor proper in the direction of tubular cross frame member 8 so that the adjustment bolts are caused to abuttingly engage the tubular member. From FIG. 2, it will be evident that upon turning adjustment bolt 120 inwardly, the upper spring 66 will be caused to wind-up in a clockwise direction which in turn will increase the torsional resistance to upward deflection of the upper control arm 26 for the left front wheel. Similarly, upon turning adjustment bolt 122 inwardly, lower spring 68 will be wound up clockwise (as viewed in FIG. 2) causing increased torsional resistance to upward deflection of the lower control arm 36 for the right front wheel. It will, therefore, be apparent that by appropriate adjustment of bolts 120 and 122, both the springs 66 and 68 may be individually adjusted to secure precise horizontal level of the sprung mass, while concurrent adjustment of the bolts will obtain the desired standing height or clearance between the sprung mass and the ground.

Figure 4:
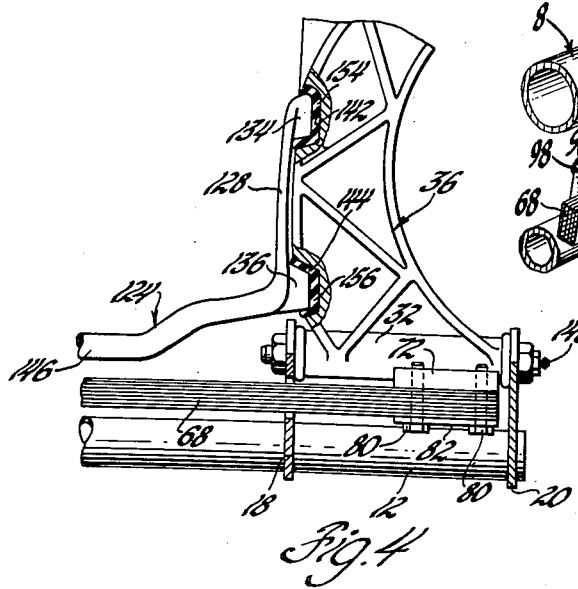
FIG. 4 is an enlarged fragmentary view taken along the lines 4—4 of FIG. 2.

According to another feature of the invention, resistance to roll or leaning of the sprung mass is accomplished by means of a generally U-shaped torsional roll stabilizer 124 which extends between lower control arm 34 and lower control arm 36. As seen best in FIG. 3, torsional roll stabilizer 124 does not require any physical attachment to the sprung mass and totally dispenses with the usual linkage connections with the opposite lower control arms. To accomplish this end in accordance with the invention, the laterally opposite rearwardly extending arm portions 126 and 128 of stabilizer 124 are formed with outwardly projecting longitudinally spaced lugs 130, 132 and 134, 136, respectively, which are adapted for nesting relation in cooperating depressions 138, 140 and 142, 144 respectively formed on the inboard walls of arms 34 and 36 respectively. In order to assure maximum functional capability with minimum possibility of dislodgment of the stabilizer, the torsionally active laterally extending central portion 146 thereof is disposed coaxially with pivot shaft 108 for lower control arm 34 and pivot shaft 148 for lower control arm 36. To assure freedom from noise, each of the depressions 138, 140 and 142, 144 is provided with rubber cups or seats 150, 152, 154 and 156 as illustrated in FIG. 4 with respect to control arm 36 and arm portion 128.

From the foregoing it will be seen that a novel, improved and substantially simplified trailing arm torsion bar suspension has been provided. It is to be particularly noted that the arrangement illustrated affords maximum utilization of existing components on both sides of the vehicle and thereby substantially reduces the number of parts required for suspensions of this general type. In addition, the invention makes it possible to substantially reduce the complexity of structure of the torsional roll stabilizer and installation thereof while retaining all of the functional benefits possessed by prior art structures.

While but one embodiment of the invention has been shown and described, it will be apparent that other changes and modifications may be made therein. It is, therefore, to be understood that it is not intended to limit the invention to the embodiment shown, but only by the scope of the claims which follow.

What is claimed is:

1. In a motor vehicle, a superstructure, a pair of laterally opposite wheels, a pair of vertically spaced longitudinally extending wheel control arms at each side of said vehicle connecting the adjacent wheel to said superstructure, the respective upper and lower control arms of each pair being pivotally mounted on said superstructure by pivot shafts extending on a common axis transversely of said vehicle, a first transversely extending torsion spring connected at one end to the upper of one of said pairs of control arms, and a second transversely extending torsion spring connected at one end to the lower of the other of said pairs of control arms, the pivot shafts for the other upper control arm and other lower control arm having inwardly projecting stub extensions, an anchor member piloted on each extension, each anchor member being connected respectively to the opposite end of the adjacent torsion bar, a lever arm on each of said anchors, and threadable means on said lever arms abuttingly engaging said superstructure so that initial torsional wind-up of said torsion springs is controlled by manual adjustment of said threadable means.

2. In a motor vehicle, a superstructure including parallel side members connected by a transverse member, a pair of laterally opposite wheels, a pair of vertically spaced longitudinally extending wheel control arms at each side of said vehicle connecting the adjacent wheel to said side members, the respective upper and lower control arms of each pair being pivotally mounted on said superstructure by pivot shafts extending on a common axis transversely of said vehicle, a first transversely extending torsion spring connected at one end to the upper of one of said pairs of control arms, and a second transversely extending torsion spring connected at one end to the lower of the other of said pairs of control arms, the pivot shafts for the other upper control arm and lower control arm having inwardly projecting stub extensions, an anchor piloted on each extension, said anchor members being connected respectively to the opposite end of the adjacent torsion bar, a lever arm on each of said anchors, and threadable means on said lever arms abuttingly engaging said transverse member of said superstructure so that the initial torsional wind-up of said torsion springs is controlled by manual adjustment of said threadable means relative to said lever arms.

3. In a motor vehicle, a superstructure, a pair of laterally opposite wheels, a pair of laterally spaced longitudinally extending wheel control arms at opposite sides of said vehicle connecting the adjacent wheel to said superstructure, said control arms having transverse hub portions pivotally mounted on said superstructure by pivot shafts extending on a common axis transversely of said vehicle, each arm having an inboard edge formed with longitudinally spaced depressions, a torsional roll stabilizer disposed between said arms, said stabilizer comprising a transverse torsionally active part and rearwardly extending trailing leg portions, said trailing leg portions being formed with longitudinally spaced lugs engaging the depressions in the adjacent arms.

4. The structure set forth in claim 3 wherein said torsional roll stabilizer is formed so that the trailing leg portions exert a predetermined lateral pressure tending to maintain said lugs in said depressions.

5. The structure set forth in claim 3 wherein said depressions are provided with elastomeric liners.

6. The structure set forth in claim 5 wherein said lugs, liners and depressions are the sole means of connecting said stabilizer to the vehicle.

References Cited in the file of this patent
UNITED STATES PATENTS

| | | |
|---|---|---|
| 2,483,974 | Hicks et al. | Oct. 4, 1949 |
| 2,734,742 | Schwenk | Feb. 14, 1956 |
| 2,828,969 | Hoffman | Apr. 1, 1958 |

OTHER REFERENCES

German application Ser. No. B 29,139, printed June 14, 1956 (K163c40).